INVENTOR.
EDWIN F. WADELTON

May 12, 1959 E. F. WADELTON 2,886,115
OFFSET WHEEL HARROW
Filed May 7, 1956 2 Sheets-Sheet 2

INVENTOR.
EDWIN F. WADELTON
BY
ATTORNEYS

United States Patent Office 2,886,115
Patented May 12, 1959

2,886,115

OFFSET WHEEL HARROW

Edwin F. Wadelton, La Habra, Calif., assignor, by mesne assignments, to Deere & Company, a corporation of Delaware Application May 7, 1956, Serial No. 583,044

7 Claims. (Cl. 172—383)

The present invention relates generally to ground working implements and is more particularly concerned with implements such as offset disk harrows of the type in which front and rear ground working units are carried on a rigid unitary frame and are transported on generally vertical shiftable wheel means, which latter also serves as gauge means determining and/or limiting the depth of operation of the ground working means.

The object and general nature of the present invention is, first, the provision of an implement of the above mentioned type in which the ground engaging gauge wheel means is so constructed and arranged as to support relatively large and heavy ground working tool means and a correspondingly large and relatively heavy frame means, and second, to provide means adjustably connecting the wheel means with the frame and incorporating adjusting means whereby the position of the frame and associated ground working means may be varied, as for leveling, or the like, while retaining the advantage of substantially uniform loading on the associated ground engaging wheels.

More specifically, the present invention incorporates a rigid implement frame carried on gauge wheel means arranged at each side of the implement, with at least one of said gauge wheel means incorporating a dual wheel unit, with means for movably or pivotally connecting the gauge wheel means as a unit to the implement frame so as to adjust the level of the latter while retaining uniform loading on the several wheels and, at the same time, providing for the proper flotation in operation, especially when working relatively soft ground. The present invention contemplates the provision of axle means carrying the several ground engaging wheels and an axle support means carrying the axle means and pivotally connected with the implement frame for movement relative to the latter about a generally fore-and-aft extending axis, whereby the implement frame, with its ground working tool means, may be leveled or otherwise adjusted relative to the ground wheel unit, as for the purpose of securing or maintaining even penetration of the ground working means, or to obtain deeper penetration at one side relative to the other, if that should be desired, while at the same time maintaining the several ground wheels in axial alignment so as to secure and maintain a substantially uniform loading on the several wheels.

These and other objects and advantages of the present invention will be apparent to those skilled in the art after a consideration of the following detailed description, taken in conjunction with the accompanying drawings, in which.

Figure 1:
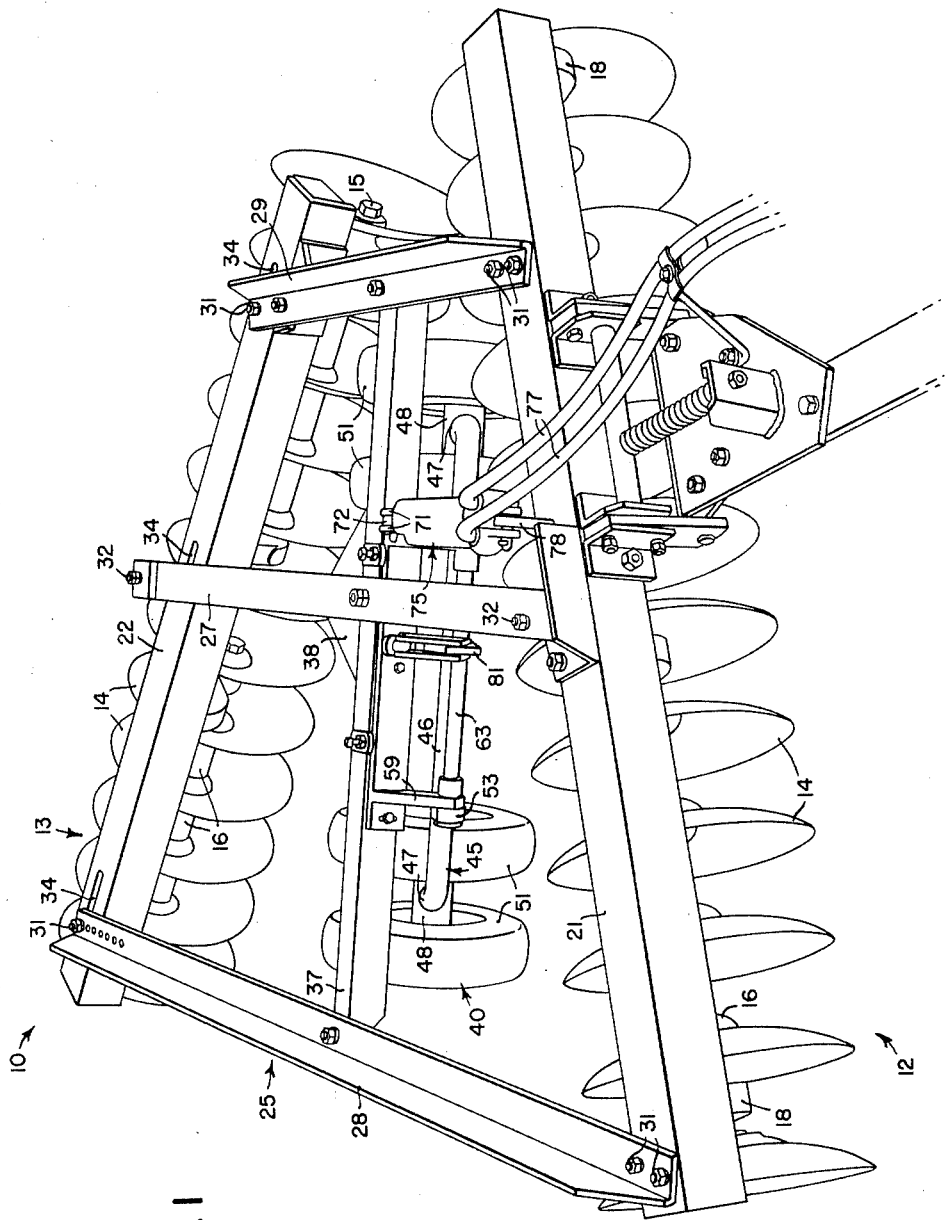
Fig. 1 is a perspective view of a heavy duty wheel type offset disk harrow in which the principles of the present invention have been incorporated.

Referring first to Fig. 1, the principles of the present invention have been illustrated as incorporated in an offset rigid frame wheel type harrow indicated in its entirety by the reference numeral 10 and comprising, in general, front and rear gangs 12 and 13, each gang including a plurality of axially align disks 14 carried on gang bolt means 15, the disks 14 of each gang being maintained in axially spaced apart relation by spools 16. Each gang is connected to the associated frame member by means of standards 18 and associated bearings (not shown) disposed adjacent each end of each of the gangs. The frame member for the front gang is indicated by the reference numeral 21 and comprises a relatively heavy angle member. The frame member for the rear gang is indicated by the reference numeral 22 and likewise comprises a relatively heavy angle, the angles 21 and 22 being disposed in angular relationship, as is conventional in offset harrows of the fixed frame type.

Figure 3:
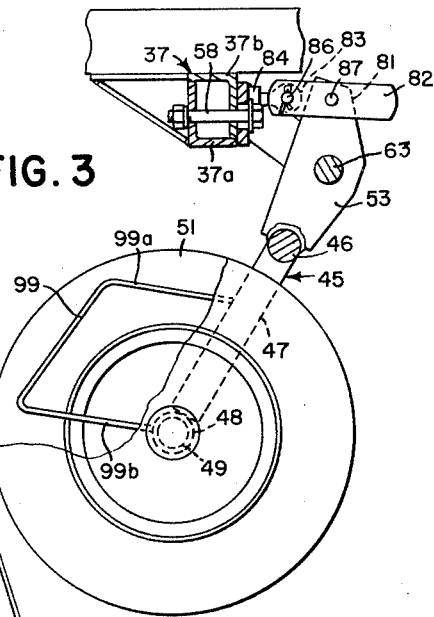
Fig. 3 is a sectional view taken generally along the line 3—3 of Fig. 2.

The frame structure of the disk harrow of the present invention is indicated in its entirety by the reference numeral 25 and comprises, in addition to the frame angles 21 and 22 mentioned above, a generally fore-and-aft extending member 27, preferably in the form of a box section, and right and left hand side angle members 28 and 29. The fore-and-aft extending frame members 27—29 are rigidly secured to the front and rear frame angles 21 and 22 in rigid relation by any suitable means, such as bolts 31, and the front and rear ends of the box member 27 are connected by bolts 32 to the generally central portion of the front and rear frame angles 21 and 22. If desired, provision may be made, such as slots 34 cooperating with the associated bolts 31 and 32, for moving the rear gang 13 laterally with respect to the front gang so as to insure that the rear disks will cut out ridges left by the front disks and also to compensate for blade sizes and wear. Further, the frame 25 also includes a transversely disposed member 37 that is rigidly secured to the central fore-and-aft extending box member 27 by any suitable means, such as by welding, which may be re-enforced by a gusset plate 38 rigidly welded or otherwise fastened to the frame bars 27 and 37. The member 37 is preferably made up of two angle members 37a and 37b welded along the meeting flange edges, thereby forming a strong box section, as shown in Fig. 3. The central portion of the cross frame member 37 may further be re-enforced by a generally transversely arranged rear bar or plate 39 that extends along the rear edge of the upper flange of the bar 37 and is welded thereto.

The harrow 10 also includes ground engaging gauge means 40 which will now be described.

The disk harrow 10 chosen to illustrate the principles of the present invention is shown as a relatively heavy duty machine capable of deep disking and adapted for use in tough field conditions where the average weight disk harrow will not perform satisfactorily. In order to provide for adjusting the depth of operation and also to provide for ready transport, the gauge wheel means 40 is arranged for generally vertical movement and controlled by means deriving operating power from the hydraulic power lift means that normally forms the part of the tractor by which the implement is drawn.

The gauge wheel means 40 comprises an axle assembly 45 which is made up of a generally bail-like shaft member 46 having ends formed to serve as wheel-receiving arms 47 to the ends of which short sleeves 48 are fixed. Suitable axle shafts are journaled for rotation by conventional bearing means in the sleeves 48, and secured to each end of each axle shaft 49 is a ground engaging wheel 51 preferably of the pneumatic tired type. The axle member 46 carries a pair of pivot arms 53 suitably welded or otherwise fixed to the generally central portion of the bail-like axle member 46, and these parts are swingably connected to an axle support structure 55. The latter comprises a cross bar 57 disposed against the forward vertical flange of the cross member 37 and pivotally connected thereto by a pivot bolt 58 that extends through aligned apertures in the bars 37 and 57. The end portions of the bar 57 carry forwardly and downwardly extending arms 59 that at their forward ends carry pivot sleeves 61. A pivot shaft 63 extends through apertures in the outer portions of the axle arms 53 and through the cylindrical members 61 on the arms 59, serving thereby as means swingably connecting the axle assembly to the axle support means. The pivot member 63 is held in position in the axle support unit 55 by means of a clip 65 welded to one end of the shaft or rod 63 and to the adjacent axle arm 53.

For the purpose of utilizing the power of the power lift unit of the tractor for raising and lowering the wheels 51 relative to the frame 25, we provide a pair of arms 71 fixedly secured to the axle 46 in laterally spaced apart relation, and disposed between the arms 71 is another arm 72 that receives the rear end of a hydraulic power unit 75, the latter comprising a piston and cylinder unit of the double acting variety, the cylinder portion of which is connected through two hose lines 77 with the power lift unit on the tractor. The forward end of the hydraulic unit 75 is connected to an apertured lug 78 that is fixed, as by welding, to the front frame angle 21. A stop member 79 is carried by the spaced apart arms 71 and is arranged in rear of the loose arm 72 so that when the hydraulic unit 75 is extended, the axle member 45 is rocked to lower the wheels relative to the frame and thus raise the latter to a transport position or at least to a position of decreased depth of operation.

When the hydraulic power unit 75 is fully extended, registering holes 80 in the arms 71 and 72 come into alignment and thus provide for the insertion of a pin into the arms 71 and 72, thereby locking them together, or the removal of such a pin if it should be desired to remove the unit 75. In order to hold the axle assembly in its transport position, an extension 81 is formed on the left hand axle arm 53 and is arranged to pass in between a pair of links 82 that are swingably connected to an adjusting eye bolt 83 that is threaded into a nut member 84 that is fixed, as by welding, to the adjacent portion of the axle support bar 57. The arm extension 81 and the links 82 are apertured so as to receive a locking pin 86 that, when inserted through the associated apertures, lock the axle unit 45 to the frame, thus serving as means holding the ground wheel means in its transport position. The cylinder arm 72 is held, when the cylinder 75 is extended, up against the stop 79, in which position the pin 87 associated therewith may be removed and inserted in the apertures in the lock-up parts 81 and 82.

As mentioned previously, the harrow in which the principles of the present invention have been incorporated is relatively heavy, and in order to provide adequate flotation, especially when utilizing the gauge wheel means 51 to limit the depth of penetration, I prefer to provide dual wheel units at each end of the axle unit 45, preferably one unit at each side of the machine. In this type of implement it is also desirable to provide means for leveling the frame on the ground wheels, to secure uniform operation, and it also may be necessary to raise or lower one side of the frame relative to the adjacent wheel means so as to provide for deeper penetration at one side as compared with the amount of penetration at the other side, or this kind of adjustment may be necessary if soil conditions are such that the disks at one side of the machine tend to dig in deeper than the disks at the other side. In prior art harrows of somewhat lighter construction, where only one wheel at each side has been required, it is a relatively simple matter to arrange axle means so that one wheel may be raised or lowered relative to the other wheel, thereby providing for the leveling of the frame relative to the wheels, as may be required. However, when dual wheels are utilized, either at one side only or at both sides of the implement as shown in Fig. 1, it is necessary to maintain all of the wheels in axial alignment in order to assure uniform loading on each of the wheels, which would not be secured if the wheel means at one side of the implement were merely raised and lowered as compared with two wheels at the other side. Therefore, according to the principles of the present invention I provide means whereby the entire wheel unit, including a dual wheel unit at one or both sides, is pivotally connected with the frame and so connected as to be swingable bodily relative to the frame about a generally fore-and-aft extending axis.

Figure 2:
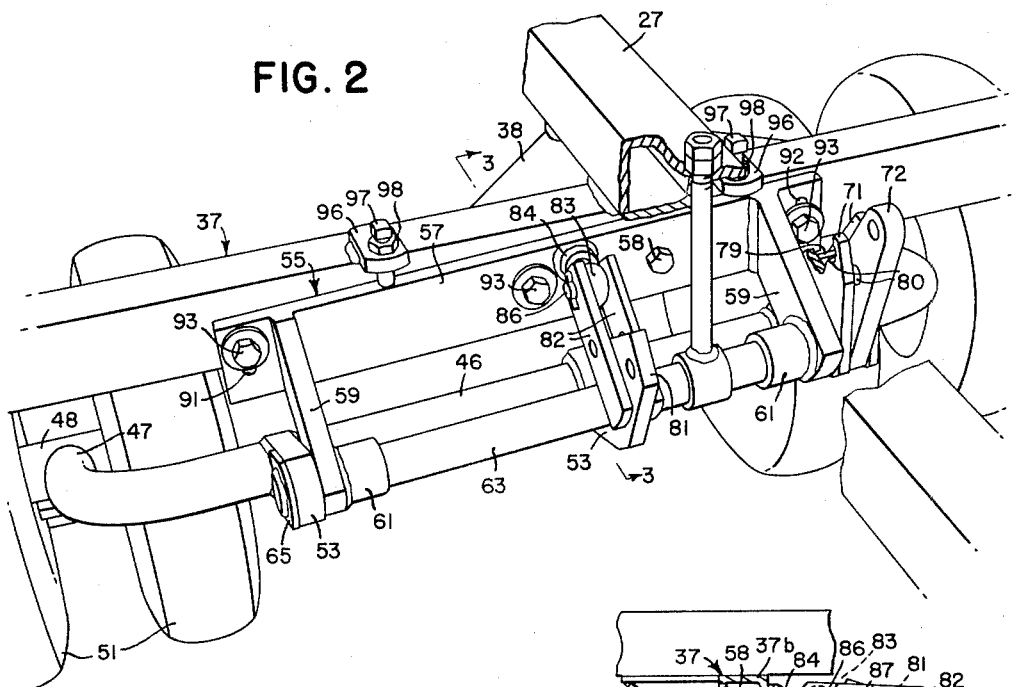
Fig. 2 is an enlarged fragmentary perspective view showing the principal details of the wheel axle mounting and associated frame parts.

Referring now to Figs. 2 and 3, it will be seen that the axle support means 55 of the present invention may swing relative to the main frame about the fore-and-aft extending axis as defined by the bolt means or pivot means 58. Further, according to the present invention, the bar 57 is slotted, as indicated at 91 and 92 (Fig. 2), and receives fastening means 93 that extends through the slots and into the transverse frame bar 37 in threaded engagement with the latter. Further, the cross bar 37 carries a pair of threaded lugs 96, each of which carries a vertically adjustable set screw 97 on which a lock nut 98 is disposed. Thus, by loosening the fasteners 93 and the lock nuts 98, and by loosening one of the set screws 97 and tightening the other, the gauge wheel axle and the gauge wheel axle support are both angularly adjustable relative to the harrow frame, such adjustment being made about the fore-and-aft extending axis as defined by the pivot member 58. After the desired adjustment has been effected, the fasteners 93 and lock nuts 98 are tightened so as to connect the axle support rigidly to the harrow frame.

The depending portions 47 of the axles 46 and 46a preferably carry wheel shields 99 that are located between the wheels 51 of each dual wheel unit and have upper and lower portions 99a and 99b welded to the associated axle portion 47 and the associated sleeve 48 respectively. The purpose of the shields 99 is to prevent excessive dirt, trash and the like from getting into the space between the wheels 51 and becoming lodged therein.

Figure 4:
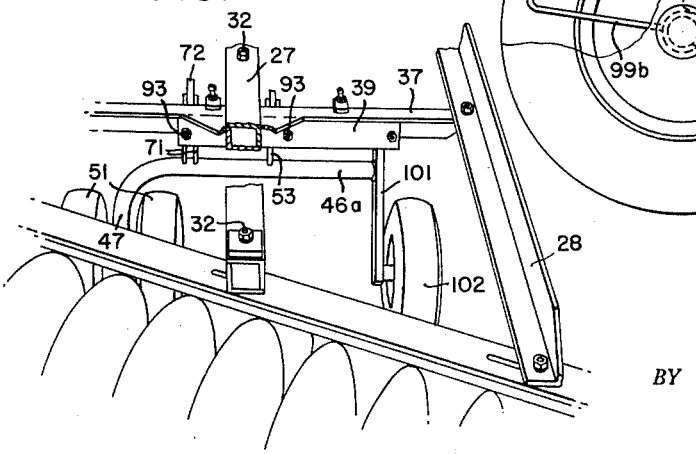
Fig. 4 is a fragmentary perspective view, showing a modified form of axle construction, especially adapted for smaller implements of the type that do not require two dual wheel units for adequate flotation.

The principles of the present invention are also applicable to disk harrows somewhat lighter than the one described above but heavier than the ordinary offset disk harrow. Usually such harrows require for proper flotation and other reasons a dual wheel unit at one side, if not at both sides, of the implement. Fig. 4 illustrates this arrangement, and from this figure it will be seen that the disk harrow shown in Fig. 4 is substantially like the one described above except that the right end of the axle member 46a has secured thereto a straight wheel bar 101 on which a single pneumatic type gauge wheel 102 is journaled. The bar 101 extends upwardly beyond the axles section 46 and is apertured at its upper end, like the axle arm 53, to receive the right end of the pivot shaft 63, whereby the upper portion of the bar 101 serves the same purpose as the arm 53 in hingedly connecting the gauge wheel means of the harrow shown in Fig. 4 to the associated gauge wheel support assembly 55. For the same reasons as set out above, the single gauge wheel 101 is held in coaxial relationship with the dual wheel unit at the other side of the implement.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A ground working implement comprising rigid frame means, fore-and-aft spaced apart ground working means carried by said frame means and extending generally transversely, a transverse axle support adjustably connected with said frame means and shiftable relative to the latter about a fore-and-aft extending axis, means fixing said support to said frame means in different positions of adjustment about said axis, an axle rockably carried on said support between said fore-and-aft spaced apart ground working means, and a plurality of ground engaging gauge wheel means carried on said axle and including a dual wheel unit adjacent one side of said frame means and wheel means at the other side of said frame means aligned axially with said dual wheel unit, said frame means including a transverse bar having a vertically disposed flange, said axle support including a transverse part including a flat portion fitting snugly against said flange and pivoted at an intermediate point to said transverse bar, and support-fixing means including slots in said flat portion and means extending through said slots and threaded into said flange.

2. A ground working implement comprising rigid frame means, fore-and-aft spaced apart ground working means carried by said frame means and extending generally transversely, a transverse axle support adjustably connected with said frame means and shiftable relative to the latter about a fore-and-aft extending axis, said frame means including a transverse bar and said axle support including generally downwardly extending arms, means fixing said support to said frame means in different positions of adjustment about said axis, an axle rockably connected with said arms between said fore-and-aft spaced apart ground working means, and including depending end portions disposed generally underneath said transverse frame bar, a plurality of ground engaging gauge wheel means carried on said depending end portions and including a dual wheel unit adjacent one side of said frame means and wheel means at the other side of said frame means aligned axially with said dual wheel unit, said generally downwardly extending arms being apertured, a pivot shaft extending through the apertures in said arms, and means fixing the ends of said pivot shaft to said rockable axle.

3. A wheel-supported ground working implement comprising rigid frame means, ground working means carried thereby, a transverse axle support adjustably connected with said frame means and shiftable relative to the latter about a fore-and-aft extending axis, means fixing said support to said frame means in different positions of adjustment about said axis, an axle rockable on said support about a generally transverse axis, a plurality of at least three axially aligned transversely spaced apart ground wheels carried by said axle, power means detachably connected with said rockable axle and with said frame means for raising and lowering the latter on said ground wheels, and means connected with said rockable arm and said axle support, and movable with the latter when the axle support is adjusted relative to said frame, for holding the frame means in an elevated position when said power means is detached therefrom.

4. An implement as defined in claim 3, further characterized by said holding means comprising link-receiving means carried by said axle support and shiftable therewith, a holding arm on said rockable arm, and a link pivotally connected with one of said link-receiving means and said holding arm and releasably connectible with the other of said link-receiving means and said holding arm, when said axle has been rocked into a frame-elevated position, for locking said axle in that position.

5. An implement as defined in claim 3, further characterized by said holding means comprising link-receiving means carried by said axle support and shiftable therewith, a holding arm on said rockable arm, and a link pivoted to said link-receiving means and releasably connectible with said holding arm when said axle has been rocked into a frame-elevated position for locking said axle in that position.

6. A ground working implement comprising rigid frame means, fore-and-aft spaced apart ground working means carried by said frame means and extending generally transversely, a transverse axle support adjustably connected with said frame means and shiftable relative to the latter about a fore-and-aft extending axis, said frame means including a transverse bar and said axle support including a cross bar disposed in contact with said transverse bar and pivotally connected thereto and a pair of generally downwardly extending arms, means fixing said support to said transverse bar in different positions of adjustment about said axis, an axle rockably connected with said arms between said fore-and-aft spaced apart ground working means, and including depending end portions disposed generally underneath said transverse frame bar, and a plurality of ground engaging gauge wheel means carried on said depending end portions and including a dual wheel unit adjacent one side of said frame means and wheel means at the other side of said frame means aligned axially with said dual wheel unit.

7. A ground working implement comprising rigid frame means, fore-and-aft spaced apart ground working means carried by said frame means and extending generally transversely, a transverse axle support adjustably connected with said frame means and shiftable relative to the latter about a fore-and-aft extending axis, means fixing said support to said frame means in different positions of adjustment about said axis, an axle rockably carried on said support between said fore-and-aft spaced apart ground working means, a plurality of ground engaging gauge wheel means carried on said axle and including a dual wheel unit adjacent one side of said frame means and wheel means at the other side of said frame means aligned axially with said dual wheel unit, said frame means including a transverse bar having a vertically disposed flange, said axle support including a transverse part, including a portion bearing against said flange and pivoted at an intermediate point to said transverse bar, and support-fixing means including slots in said portion and means extending through said slots and connected with said flange.

References Cited in the file of this patent

UNITED STATES PATENTS

| | | |
|---|---|---|
| 919,854 | Gross | Apr. 27, 1909 |
| 1,011,819 | Krueger | Dec. 12, 1911 |
| 1,577,546 | Spear | Mar. 23, 1926 |
| 1,822,211 | Gravely | Sept. 8, 1931 |
| 2,556,610 | Biszantz | June 12, 1951 |
| 2,613,491 | Evans et al. | Oct. 14, 1952 |
| 2,667,724 | Johnson et al. | Feb. 2, 1954 |
| 2,672,084 | Forgy | Mar. 16, 1954 |
| 2,701,993 | Allison | Feb. 18, 1955 |
| 2,790,648 | Sweetland | Apr. 30, 1957 |